United States Patent
Barnard

(10) Patent No.: US 7,252,765 B2
(45) Date of Patent: Aug. 7, 2007

(54) PROCESS FOR IMPROVING PHOSPHOROUS REMOVAL IN WASTE WATER TREATMENT WITHOUT CHEMICAL ADDITION

(75) Inventor: James L. Barnard, Leawood, KS (US)

(73) Assignee: Black & Veatch Holding Co., Kansas City, MO (US)

( * ) Notice: Subject to any disclaimer, the term of this patent is extended or adjusted under 35 U.S.C. 154(b) by 0 days.

(21) Appl. No.: 10/790,518

(22) Filed: Mar. 1, 2004

(65) Prior Publication Data

US 2005/0189295 A1   Sep. 1, 2005

(51) Int. Cl.
 *C02F 3/30* (2006.01)
(52) U.S. Cl. .............. 210/605; 210/623; 210/906; 435/262.5
(58) Field of Classification Search ............. 210/605, 210/621, 623, 630, 903, 906; 435/262, 262.5
See application file for complete search history.

(56) References Cited

U.S. PATENT DOCUMENTS

| | | | |
|---|---|---|---|
| 3,236,766 A | 2/1966 | Levin | |
| 3,385,785 A | 5/1968 | Forrest et al. | |
| 3,939,068 A * | 2/1976 | Wendt et al. | ............... 210/605 |
| 3,964,998 A | 6/1976 | Barnard | |
| 4,183,808 A | 1/1980 | Drnevich | |
| 4,415,454 A | 11/1983 | Fuchs | |
| 4,431,543 A * | 2/1984 | Matsuo et al. | ............. 210/605 |
| 4,488,967 A | 12/1984 | Block et al. | |
| 4,500,429 A | 2/1985 | Reimann et al. | |
| 4,503,154 A * | 3/1985 | Paton | ........................ 435/167 |
| 4,507,207 A | 3/1985 | Verhoeve et al. | |
| 4,696,746 A * | 9/1987 | Ghosh et al. | ............... 210/603 |
| 4,917,805 A | 4/1990 | Reid | |
| 5,228,996 A | 7/1993 | Lansdell | |
| 5,246,585 A * | 9/1993 | Meiring | ..................... 75/709 |
| 5,266,200 A | 11/1993 | Reid | |
| 5,288,405 A | 2/1994 | Lamb, III | |

(Continued)

FOREIGN PATENT DOCUMENTS

| | | | |
|---|---|---|---|
| JP | 3-278896 | * | 12/1991 |
| JP | 3-296498 | * | 12/1991 |
| JP | 10-249387 | * | 9/1998 |

OTHER PUBLICATIONS

South Cary Water Reclamation Facility's Nutrient Removal Modifications and Reduction Success, Town of Cary, North Carolina, Publication Date: 2001.

(Continued)

*Primary Examiner*—Fred G. Prince
(74) *Attorney, Agent, or Firm*—John C. McMahon

(57) ABSTRACT

A wastewater treatment process wherein a portion of a mixture of influent waste water and biomass are transferred from a first anaerobic region to a second anaerobic region having a relatively long retention time in order to produce additional very short chain fatty acids therein which are thereafter returned to the first anaerobic region so that biomass therein takes up the very short chain fatty acids. The contents of the first anaerobic region thereafter flow downstream into an aerobic region wherein the biomass takes up phosphorus. A portion of the biomass is returned to the first anaerobic region and a second portion of the biomass is wasted with phosphorus therein, thereby removing phosphorus from the wastewater being treated.

4 Claims, 1 Drawing Sheet

U.S. PATENT DOCUMENTS

| | | | | |
|---|---|---|---|---|
| 5,342,522 | A | * | 8/1994 | Marsman et al. .......... 210/605 |
| 5,393,427 | A | * | 2/1995 | Barnard ...................... 210/605 |
| 5,397,474 | A | * | 3/1995 | Henry ........................ 210/615 |
| 5,601,719 | A | | 2/1997 | Hawkins et al. |
| 5,733,456 | A | | 3/1998 | Okey et al. |
| 5,942,108 | A | | 8/1999 | Yang |
| 6,030,528 | A | | 2/2000 | Han |
| 6,139,743 | A | * | 10/2000 | Park et al. .................. 210/605 |
| 6,217,766 | B1 | * | 4/2001 | Stetter et al. ............... 210/605 |
| 6,312,599 | B1 | | 11/2001 | Reid |
| 6,338,800 | B1 | | 1/2002 | Kulperger et al. |
| 6,344,143 | B1 | | 2/2002 | Ahn et al. |
| 6,531,058 | B1 | * | 3/2003 | Josse et al. .................. 210/151 |
| 6,706,185 | B2 | * | 3/2004 | Goel et al. .................. 210/605 |
| 2001/0045390 | A1 | * | 11/2001 | Kim et al. .................. 210/605 |
| 2002/0158009 | A1 | * | 10/2002 | Khudenko .................. 210/605 |
| 2003/0217968 | A1 | * | 11/2003 | Goel et al. .................. 210/605 |

OTHER PUBLICATIONS

Evaluation of Several Water Reclamation Facilities Employing Biological Nutrient Removal in North Carolina, Publication Date: Nov. 2001.

New BPR Process Achieves High Phosphorous Removal Levels, Publication Date: Oct. 1994.

Conference on New Directions and Research in Waste Water and Residuals Management the Role of Full Scale Research in Biological Phosphate Removal, James L. Barnard, date unknown.

Fermentation of Return Activated Sludge to Enhance Biological Phosphorous Removal, Publication Date: 2002.

Exhibit 1—Various Treatment Facilities, dates unknown.

* cited by examiner

PROCESS FOR IMPROVING PHOSPHOROUS REMOVAL IN WASTE WATER TREATMENT WITHOUT CHEMICAL ADDITION

BACKGROUND OF THE INVENTION

The present application is directed to a process for the biological treatment of wastewater to remove organic matter, especially while reducing the phosphorus content of the effluent water without adding additional chemicals for the phosphorus removal.

Wastewater treatment has progressed substantially in the last fifty years. Early treatments utilized various chemicals to rid the wastewater of organic material. Subsequently, most chemical treatments have been surpassed by use of microorganisms which through various processes convert organic impurities in the water to various combinations of carbon dioxide, methane, water and inorganic nitrogen and phosphorus compounds.

While microorganisms are effective in reducing organic content, phosphorus and nitrogen often present problems in effluent water from biological processes. The present application is especially directed to an improved process for the removal of phosphorus from the water.

Phosphorus presents an eutrophic problem in that it substantially enhances the growth of aquatic plant life such that an influx of phosphorus may cause sufficient plant growth in streams or lakes to kill fish or produce other problems. Phosphorus is also a common component of human or animal waste and of many household or industrial products of the type that are likely to become a component of waste water collected in a city's sewer system, such as soap for washing clothes wherein phosphorus is used as whitener.

Previous processes have been developed to try to rid effluent from wastewater treatment plants of phosphorus. For example, one process wherein biomass and wastewater are mixed in an aerated tank is generally known as the Phostrip process. In the Phostrip process the biomass with some uptake of phosphorus in the bacteria is separated from the clarified water. The separated biomass is then subjected to an anaerobic condition in a thickener or stripper. In the stripper phosphorus is released by the bacteria and a phosphorus rich decant is removed from the stripper and treated with lime to remove the phosphorus. The biomass is then returned to the aerated tank to mix with incoming wastewater. This process has varying degrees of success, but requires the chemical addition of lime in order to work.

In 1974 the inventor of the present application discovered that placement of an unaerated zone or region upstream of an aerobic region in an activated sludge process would result in phosphorus uptake by the bacteria when in the aerobic region. This process is generally referred to as the Phoredox process. However, high phosphorus removal with this process was not successful with all influent waste water streams.

Subsequently, Fuhs and Chen in trying to understand the mechanism of phosphorus uptake by bacteria suggested that certain microorganisms (phosphate accumulating organisms), while obligate aerobic organisms, could take up and store certain short chain volatile fatty acids, especially acetic acid and propionic acid in an anaerobic treatment region and later use the fatty acids to take up phosphorus that is stored in the bacteria as polyphosphate in an aerobic treatment region. In theory the microorganisms store polyphosphate as an energy source in the aerobic region and release the energy stored in the polyphosphate later by breaking high energy phosphate bonds creating surplus phosphates which are released in a preceding non aerated region. Thereafter, if short chain fatty acids are available in an anaerobic region, the acids are stored in certain bacteria as an intermediate product, such as poly-β-hydroxybuterate (PHB). As the biomass passes to the aerated region, the microorganisms that have stored the organic acids metabolize the PHB and use the energy gained to again take up phosphorus from the surrounding liquid. Within the theory of this process the microorganisms will take up more phosphorus in the aerobic region than is released in the anaerobic region, if sufficient amounts of the short chain fatty acids are available. Thus, in theory, if excess biomass is wasted, then the phosphorus in the influent wastewater should be wasted with the wasted biomass. If insufficient fatty acids are present, then the phosphorus will remain outside the biomass and will be discharged with the effluent water.

While certain actual treatment facilities do receive wastewater with such short chain fatty acids in sufficient quantity to produce at least some phosphorus reduction, many have little or do not have enough to remove most or at least a substantial amount of the phosphorus. The shortage of short chain fatty acids can be made up by addition of the fatty acids from an external source, but this is a comparatively expensive and undesirable chemical addition.

Consequently, applicant has found a need for a method of biologically producing such short chain fatty acids within the biological process and has found a simple and surprisingly effective method and apparatus for doing so.

SUMMARY OF THE INVENTION

A process and apparatus are provided to improve the removal of phosphorus from a waste water stream without requiring the addition of chemicals to achieve improved phosphorus removal. In particular, in the treatment of the wastewater, the water is first directed to a first anaerobic region, zone or basin wherein the influent wastewater is mixed with biomass containing microorganisms that has been removed from previously treated wastewater and partially recycled to the first anaerobic region. The biomass prior to being recycled to the first anaerobic region is comparatively starved for organic food in that it has not been exposed to an organic food source since entering the biomass recycling system. Also, the biomass prior to being recycled to the first anaerobic region contains a comparatively high amount of phosphorus that is available to provide energy to the bacteria in the biomass. In the first anaerobic region, the biomass mixes with and absorbs organic food material contained in the influent wastewater. A portion of the organic food material in the wastewater is normally short chain volatile fatty acids, especially acetic acid and propionic acid and this term is intended to include intermediaries of such acids. These short chain fatty acids are especially important in the process of the present invention, because when these acids are metabolized in a subsequent aerobic region, the fatty acids provide energy needed for the biomass to uptake and store phosphorus. If the fatty acids are not present in sufficient quantity then the phosphorus that is contained in the incoming biomass may not be taken up later by the biomass nor will the phosphorus in the influent wastewater be taken up, so that the phosphorus that is not later taken up will pass through with the water and will be discharged with the effluent water stream. Some influent wastewater streams have insufficient short chain fatty acids to allow the biomass to later take up the phosphorus or only enough to take up some of the phosphorus. The process of the present invention allows facilities treating wastewater that are deficient in short chain fatty acids to achieve very good biological phosphorus removal without requiring chemical addition to chemically remove the phosphorus or to require the addition of fatty acids from an outside source.

In the first anaerobic region, solids retention time is such that certain microorganisms in the biomass that contain phosphorus utilize the phosphorus to produce energy and in so doing release at least some of the stored phosphorus into the fluid within the first anaerobic region.

While the phosphorus is being released, a side stream of the biomass-wastewater mixture (mixed liquor) is removed from the first anaerobic region, preferably on a continuous basis and directed to a second anaerobic region, zone or basin wherein the flow rate and solids retention is slowed compared to the first anaerobic region. For example, the first anaerobic region may have a flow rate calculated to provide a solids retention time that will in turn produce a biomass concentration of 2000 to 4000 milligrams per liter, whereas the biomass concentration in the second anaerobic region is preferably in the range from 7000 to 25,000 milligrams per liter. Preferably, the side stream enters near the bottom of the second anaerobic region and flows upwardly therethrough.

In the second anaerobic region, it is preferably desirable to have the flow rate sufficiently slow to allow a biomass blanket to form on the bottom of the region and to fill the second anaerobic region to the level where the fluid therefrom flows out of the second anaerobic region. The flow from the second anaerobic region is returned to the first anaerobic region, although the flow from the second anaerobic region is returnable to near the same locations from which is was withdrawn from the first anaerobic region or, for example, the return flow can be returned to a downstream location in the first anaerobic region so that the short chain fatty acids produced in the second anaerobic region is mixed with the biomass before entering an aerobic region.

In the second anaerobic region, certain microorganisms in the biomass in an anaerobic process convert or ferment longer chained organic compounds in the wastewater to the desired very short chain volatile fatty acids including, especially acetic acid and propionic acid and related compounds. While it is desirable for the biomass to build up in the second anaerobic region, it is also desirable for the short chain fatty acids to flow through and be washed or carried by the outflow from the second anaerobic region to the first anaerobic region.

When the short chain fatty acids are received in the first anaerobic region, the microorganisms in the first anaerobic region that have used the phosphorus therein to produce energy and that have expelled at least a portion of the phosphorus, take up, acquire or absorb the short chain fatty acids that were produced in the second anaerobic region without metabolizing the fatty acids in an oxygenated process.

Subsequently, the mixed liquor from the first anaerobic region is flow transferred downstream to an anoxic region and, thereafter, to an oxic or aerobic region. In the oxic region, the short chain fatty acids that were acquired by the microorganism or stored therein or therewith, are metabolized utilizing oxygen to produce energy. After the metabolization of the short chain fatty acids, it is theorized that the associated microorganisms then have sufficient energy to again take up phosphorus from the mixed liquor and store this phosphorus in a form having high energy phosphate bonds. The amount of phosphorus taken up by the biomass in the oxic region, provided that there is sufficient short chain fatty acids present in the first anaerobic region, is greater than was released in the first and second anaerobic regions, so not only is the phosphorus that was released in the anaerobic regions reacquired, but also a major portion or all of the phosphorus that was contained in the incoming wastewater is taken up by the biomass. This is possible partly because the quantity of the biomass has grown and is greater by the time the biomass flows downstream from the anaerobic regions to the oxic region as compared to the biomass that was recycled to the first anaerobic region, but more so because of the energy gain in the biomass that subsequently results from sufficient short chain fatty acids being present in the anaerobic region in accordance with the present invention.

Some of the effluent from the oxic region may be recycled to the anoxic region. The remainder of the effluent of the oxic region flows downstream to a clarifier wherein flow rates are slowed and the biomass is allowed to settle due to gravity in a quiescent region and become separated from clarified water. A portion of the biomass from the clarifier is wasted to storage or transferred to another process for further processing and the remainder is preferably recycled to the first anaerobic region. Preferably, the recycled biomass flows first through a preanoxic region and thereafter to the first anaerobic region to remove nitrates in the biomass. The clarified water with a consequent comparatively low or no phosphorus content is discharged from the process.

It is also noted that certain wastewater includes nitrogen compounds that are present in the influent or that are formed by operation of the microorganisms on organic material containing nitrogen. The present process is cooperatively usable with conventional nitrogen removal stages or processes.

OBJECTS AND ADVANTAGES OF THE INVENTION

Therefore, the objects of the present invention are to provide an apparatus for use in waste water treatment for operably removing phosphorus from influent waste water being treated and that has insufficient short chain fatty acids to support substantial phosphorus removal utilizing microorganisms and without requiring chemical addition for the phosphorus removal; to provide such an apparatus having a first anaerobic region for mixing influent waste water and recycled biomass to form a mixed liquor and a second anaerobic region with associated flow conduits and pumps or the like to allow a portion of the mixed liquor to be transferred from the first to the second anaerobic region wherein the solids retention rate is increased in comparison to the first anaerobic region and wherein fermentation processes produce short chain volatile organic acids which are thereafter returned to the first anaerobic region for uptake by microorganisms therein; to provide such an apparatus having an oxic region flow located downstream from the first anaerobic region for aerobically treating the mixed liquor so that certain microorganisms that have stored short chain fatty acids as PHB, metabolize the PHB and, thereafter, uptake phosphorus; to provide such an apparatus having a settling region for separating biomass from clarified water downstream of the oxic region and from which a portion of the separated biomass is wasted and the remainder is returned to the first anaerobic region; to provide such an apparatus including structure for operably reducing nitrogen containing compounds in the waste water that acts cooperatively with the remainder of the apparatus; to provide a method to be used in conjunction with the above noted apparatus that allows removal of all or a large portion of phosphorus from a waste water stream that has insufficient short chain fatty acids to provide for such removal and wherein the process does not require addition of chemicals such as lime, metal salts or short chain fatty acids from an external source in order to achieve relatively high phosphorus removal so that effluent water is relatively low in phosphorus content; and to provide such an apparatus and method which are environmentally beneficial, are easy to use for their intended purpose, are comparatively inexpensive relative to other processes that remove phosphorus and are especially well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
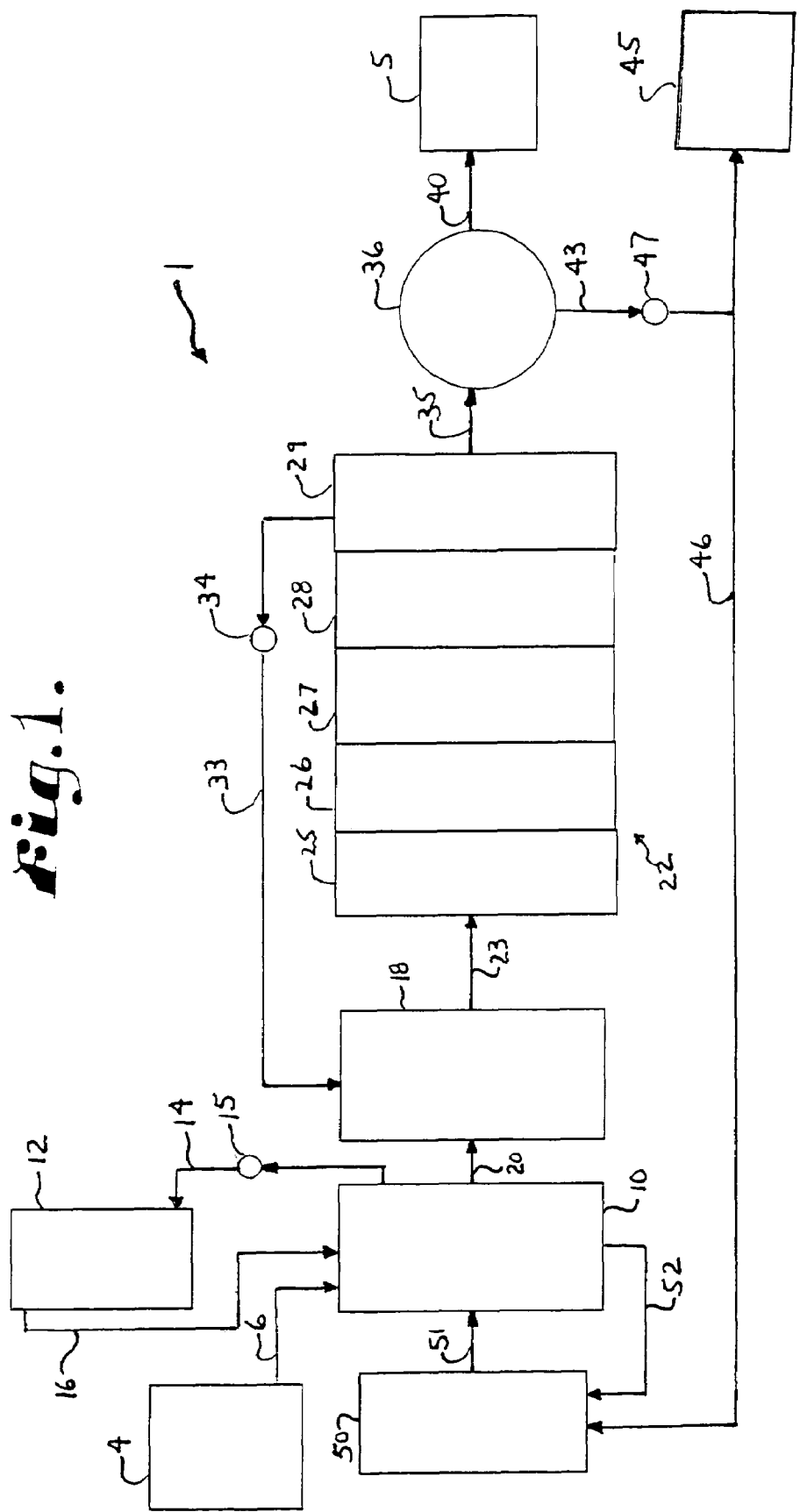
FIG. 1 is a schematic drawing of a waste water treatment apparatus, especially adapted for the removal of phosphorus from the waste water in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a waste water treatment facility. Waste water from city collection sewers, industrial sewers or other sources of wastewater including organic material and phosphorus containing compounds, is collected or fed directly into the facility 1 from a waste water influent region generally identified by the reference numeral 4. Effluent clarified water is discharged from the facility 1 to a discharge region generally identified by the reference numeral 5. The discharge region 5 may be a holding tank or the clarified water is preferably discharged to a stream, lake or the like.

A first anaerobic basin, tank, zone or region 10 is provided to preferably receive all of the influent wastewater from the region 4 through flow conduit 6. However, in certain wastewater treatment processes a portion of the influent wastewater may be directed to other regions for cooperate treatments or for alternative reasons. Also preferably, the flow of wastewater into the region 10 is continuous and the first anaerobic region 10 is constructed such that the influent wastewater generally enters the first anaerobic region 10 on one side and flows to the other side. Alternatively, or in addition, it is foreseen that the influent wastewater may enter from the top or bottom and exit the opposite or any alternative flow configuration to provide a pass through flow pattern. The anaerobic region 10 is sized to handle an expected average volume of influent wastewater and this in combination with the flow path allows design of the first anaerobic region 10 such that the influent wastewater flows through the first anaerobic region with a preselected calculated and preferred solids residence time therein. For example, a preferred solids retention for the first anaerobic region 10 is between 2000 and 4000 milligrams per liter of biomass solids, although it is foreseen that this may be varied according to site and operational circumstances. A hydraulic retention time within the first anaerobic region 10 is preferably between about 0.5 and 2.0 hours. The anaerobic region 10 (as with the other regions discussed herein) may be clearly defined by the structure such as a tank or basin or may be simply a part of a flow channel through which the water flows and wherein different regions are defined by the process that occurs in the regions. Likewise, conduits may be specific pipes or other flow directing structure such as overflow weirs and the like.

In the anaerobic region 10, the waste water is mixed with recycled biomass which results from processing which will be discussed further below, so as to form a mixed liquor of living biomass and waste water to be treated. The anaerobic region 10 does not have added oxygen and is preferably entirely free of nitrates or is sufficiently lacking in oxygen that bacteria in the biomass can not take in sufficient oxygen to significantly perform oxygenated metabolic processes.

The biomass that is recycled to the first anaerobic region 10 is comparatively starved for organic food, such as is found in the wastewater. This biomass also includes a wide variety of microorganisms at least some of which are capable of fermenting organic material in the absence of oxygen and some of which are capable of metabolizing organic materials to carbon dioxide and water in the presence of oxygen. The biomass specifically includes microorganisms, such as Acinetobacter spp that are phosphate accumulating organisms. The phosphate accumulating organisms while in the first anaerobic region 10 utilize energy stored in phosphorus bonds within the organism phosphorus compounds therein to produce energy in the absence of oxygen and subsequently both release excess resulting phosphates into the waste water and absorb volatile short chain fatty or organic acids (including acetic and propionic acid), if such acids and related compounds are present in the water. The organic acids are believed in theory to be temporarily taken up within the microorganisms while in the first anaerobic region 10.

A portion of the mixed liquor is removed from the anaerobic region 10 and transferred to a second anaerobic region 12 that is also referred to by the term "anpref" region, because the second anaerobic region 12 is maintained under anaerobic conditions and functions as a prefermenter.

Flow passes from the first anaerobic region 10 to the second anaerobic region 12 through a conduit 14 and is driven and controlled by a pump 15. Flow returns from the second anaerobic region 12 to the first anaerobic region 10 through a conduit 16. Preferably, the flow in the second anaerobic region 12 enters near the bottom and exits near the top thereof. Furthermore, the second anaerobic region 12 is sized and the flow rate thereinto is selected so that flow through the second anaerobic region 12 is comparatively slow and solids retention time (SRT) is comparatively high compared to the first anaerobic region 10, such that biomass collects therein and forms a blanket that rest on the bottom of the second anaerobic region that preferably fills the second anaerobic region 12. Normally the blanket will fill the second anaerobic region 12 to overflowing.

Preferably, the flow rate through the second anaerobic region 12 is selected and the second anaerobic region 12 is sized so that the concentration of the biomass is between 7,000 and 25,000 milligrams per liter therein. Because of the substantially oxygen free and fermenting conditions in the second anaerobic region 12, certain and various organic compounds found in the wastewater are reduced to simple and relatively short chain fatty acids (especially acetic acid and propionic acid and intermediaries thereof). The short chain fatty acids are generally volatile and are more easily "washed" or urged through the anaerobic region 12 in comparison to the larger and entangled microorganisms in the biomass therein by the comparatively slow flow rate through the second anaerobic region 12, so as to wash the short chain fatty acids over into the first anaerobic region 10 through the conduit 16. The conduit 16 can be provided with multiple outlets or other mixing devices to improve disbursement of the fatty acids within the wastewater in the first anaerobic region 10.

It is theorized in accordance with the invention that the microorganisms that have utilized the energy from phosphorus bonds and discharged the phosphorus in the anaerobic regions, then take up the short chain fatty acids in the anaerobic regions and may store such for later use, sometimes as intermediate products especially poly-$\beta$-hydroxy buterate (PHB).

While the second anaerobic region 12 is depicted and described as receiving and discharging through conduits, it is foreseen that the flow could be directed by or through various types of structures or overflows. Furthermore, while a pump is shown in the illustrated embodiment to urge flow through the second anaerobic region 12, the second anaerobic region 12 could be below, level with or above the first anaerobic region 10 so that gravity can be used in certain instances to direct flow. Still furthermore, flow can be urged by other types of well known devices that perform the equivalent function.

In many waste water treatment facilities of the type described herein flow rates are such that the concentration of biomass in the first anaerobic region 10 is on the order of from 2000 to 4000 milligrams per liter, although as noted above variation outside this range occurs at certain locations. Preferably, also as noted before the biomass concentration in the second anaerobic region 12 is within a range from 7000 to 25,000 milligrams per liter. This increased concentration indicates that the solids retention time of the second anaerobic region 12 is greater in comparison to the first anaerobic region 10.

It is foreseen under the invention that alternative systems may be employed to create an anaerobic region wherein biomass is located in such a manner that increased fermentation will occur due to biological activity and that very short chain fatty acids will be produced prior to passage of mixed liquor into an anoxic or aerobic region. In this manner, the fatty acids cooperate with certain microorganisms to release phosphorus and take up the fatty acids in the anaerobic region, such that a rebound effect will occur at a downstream location in the presence of oxygen where the microorganisms will respire and metabolize organic material using oxygen therein and thereafter take up phosphorus from the surrounding mixed liquor and store the phosphorus with high energy within the cells of certain microorganisms in the biomass. It is foreseen that in some instances, the second anaerobic region could have a low level of organic food and given sufficient time that the biomass itself provides the food source.

It is also foreseen that the second anaerobic region 12 may be fitted with a mixer that would not be utilized during normal operation but which may be operated from time to time to reposition biomass therein. A pump could also be used for this purpose by directing circulating flow into multiple locations near the bottom of the second anaerobic region 12.

It is further foreseen that first anaerobic region 10 may also be divided into subregions with the flow to the second anaerobic region 12 coming from a different subregion than the subregion receiving return flow.

Downstream of the second anaerobic region 12 is an anoxic region 18 joined to the first anaerobic region 10 by a conduit or flow channel 20. Operably, the anoxic region 18 is utilized in a well known and conventional manner to remove nitrates from the mixed liquor therein.

The mixed liquor is subsequently directed from the anoxic region 18 to an aerobic region 22 through a conduit or flow channel 23. In the illustrated embodiment, the aerobic region includes five oxic or aerobic subregions 25 to 29. It is foreseen that the number of oxic regions may vary greatly in accordance with the needs of the particular site. The aerobic region 22 includes mixers and is operated in a well known manner so as to inject oxygen by sparging oxygen or air into the liquor, by spraying liquor into the air, or the like, so that oxygen or air including oxygen enters the aerobic region 22 while mixed liquor in the aerobic region 22 is being mixed. A portion of the mixed liquor exiting the aerobic region 22 is preferably returned to the anoxic region 18 through conduit or flow path 33 under control of pump 34. For example, preferably between 50% and 60% of the outflow of the region 22 may be returned to the region 18 so that any nitrates formed in the aerobic region 22 may be reduced in the anoxic region 18 the anoxic region 18 is mixed but not aerated.

In the aerobic region 22, certain of the microorganisms in the biomass therein take up oxygen through respiration and convert organic material to carbon dioxide and water. Also, certain of the microorganisms in the biomass take up phosphorus from the surrounding liquor. Because the biomass grows between recycle and the return thereof to the aerobic region 22, but much more importantly, because the organisms taking up phosphorus have sufficient stored food from the short chain fatty acids in the form of PHB absorbed in the first anaerobic region 10, the biomass and, in particular, the phosphorus accumulating organism in the biomass in the aerobic region 22 takes up more phosphorus than is released in the anaerobic regions 10 and 12 provided that the short chain fatty acids are available in the first anaerobic region 10. Thus, the microorganisms in aerobic region 22 preferably take up what was released in all anaerobic regions plus up to 99% of all of the phosphorus coming into the facility 1 with the wastewater influent.

Discharge from the region 22 is directed through conduit or flow channel 35 to a clarifier 36. The clarifier 36 is not mixed and flow rates are sufficiently slow to allow the biomass to become quiescent and settle to the bottom of the clarifier 36 and clarified water to raise to the top. The clarified water is directed through a channel 40 to the clarified water discharge region 5.

The biomass in the collected solids blanket at the bottom of the clarifier 36 is directed to a conduit or flow channel 43 which bifurcates into a wasted or sludge stream to wasted biomass storage 45 and a recycle biomass stream 46 and is urged therethough by a pump 47. The amount of biomass wasted each day is approximately equal to the additional biomass made each day by the process, that is, the growth portion of the biomass once the facility 1 has achieved steady state conditions, so as to continue to operate under such steady state conditions.

The recycled biomass in the flow stream 46 is directed under flow from the pump 47 to a pre-anoxic region 50. The pre-anoxic region 50 has no added oxygen and is positioned and operated in such a manner as to remove nitrates that are in the biomass by known processes. The biomass flows from the pre-anoxic region 50 through a conduit or flow channel 51 to the first anaerobic region 10 to be mixed with the influent waste water. A return line 52 flows some mixed liquor from the first anaerobic region 10 to the pre-anoxic region 50.

It is foreseen under the scope of the invention that a fraction of the influent wastewater may be directed directly to the second anaerobic region or may be mixed with the slip stream from the first anaerobic region to the second anaerobic region. Preferably, the fraction of wastewater directed to the second anaerobic region without passing through the first anaerobic region would be less than about 10 percent of the total influent wastewater flow. The mixture of flows to the second anaerobic region in this manner may be utilized to control the detention time in the second anaerobic region so as to improve volatile short chain fatty acid production. The addition of influent waste water to the second anaerobic region without passing through the first anaerobic region assists in elutriating the volatile short chain fatty acids from the second anaerobic region in this manner, while not decreasing the solids retention time.

The following example is provided for the purpose of demonstrating the invention and is not intended to limit the scope of the invention or the claims of this application.

EXAMPLE

A pilot facility was constructed in accordance with the layout shown in FIG. 1 which was utilized to treat wastewater. The facility was operated sequentially in a first mode and thereafter in a second mode.

In both modes of operations, the influent flow rate was 50 cubic meters of waste water per day. Further, an average the flow in channel 20 was 75 cubic meters per day, the flow in channel 23 was 175 cubic meters per day, the flow in channel 35 was 75 cubic meters per day, the flow in recycle channel 33 was 100 cubic meters per day, the flow in effluent channel 40 was approximately 50 cubic meters per day, the flow in recycle sludge channel 46 was 25 cubic meters per day, the flow in channel 51 was 40 cubic meters per day and the flow in channel 52 was 15 cubic meters per day.

The pilot facility was operated in mode 1 for one year. In mode 1, all flow to the second anaerobic region 12 and through channels 14 and 16 was prevented by effectively removing region 12 from the facility by blocking channels 14 and 16.

The typical influent COD (amount of organic and oxygen using matter measured as chemical oxygen demand) was approximately 300 milligrams per liter and the influent had a particulate and colloidal fraction of approximately 60%. The first anaerobic region 10 had a volume of 2.07 cubic meters. The mixed liquor in the first anaerobic region 10 had mixed liquid solids averaging approximately 3000 milligrams per liter and the total mass of COD entering the first anaerobic region 10 with the influent wastewater averaged approximately 9 kilograms per day. The phosphorus entering with the influent wastewater averaged approximately 4 milligrams per liter. The average mass of solids in the first anaerobic region 10 at any time was approximately 2.07 kilograms.

During the year of operation in the first mode, the facility experienced a non rainy season and a rainy season. During the rainy season, the concentrations of non water components in the wastewater were highly diluted due to large amounts of rain water. During the non rainy season, the phosphorus content in the effluent clarified water was approximately 0.5 milligrams per liter following an influent phosphorus concentration of about 4 milligrams per liter. However, acetate was required as a chemical addition in the amount of between 5 and 10 milligrams per liter of influent wastewater in order to obtain such reduction in phosphorus level.

Subsequent to operation in the first mode, the facility was operated in the second mode. In the second mode, the second anaerobic region 12 (anpref region) was flow connected to the facility and flow was allowed through channels 14 and 16. The second anaerobic region had a volume of 3 cubic meters. Flow from the first anaerobic region 10 to the second anaerobic region 12 (and back) was 1.5 cubic meters per day and the daily transfer of solids from the first anaerobic region 10 to the second anaerobic region 12 averaged approximately 4.5 kilograms per day. Approximately 0.27 kilograms of COD was absorbed by the biomass in the second anaerobic region 12 each day. The mass of the solids in the second anaerobic region 12 averaged approximately 75 kilograms at any time.

The ratio by weight of volatile suspended solids (VSS) to total suspended solids (TSS) in the mixed liquor in the first anaerobic region 10 and as transferred to the region 12 averaged approximately 0.78. While in the second anaerobic region 12, approximately 25 percent of the VSS was fermented by the biomass to volatile organic acids. The ratio of the VSS to COD in the biomass in the second anaerobic region 12 averaged approximately 1.42 by weight. As noted before, the flow rate through the second anaerobic region 12 was approximately 1.5 cubic meters per day. The average daily production of volatile organic acids produced by fermentation in the second anaerobic region 12 averaged approximately 0.8775 kilograms per day and approximately 0.24 kilograms per day of volatile organic acids were produced in the first anaerobic region 10 for a total of about 1.1475 kilograms per day of short chain fatty acids entering the first anaerobic region 10 from all sources.

For a process of this type it is calculated that volatile organic or fatty acids in an amount approximately 4 times the mass of influent phosphorus is required in order to provide a high degree of phosphorus removal in accordance with the present invention. Total influent phosphorus level (phosphorus in the influent wastewater) at the time of operation of the second mode averaged approximately 0.25 kilograms per day which in theory required approximately 1.00 kilograms per day of volatile organic acids in the first anaerobic region 10 to complete the biological phosphorus process and which was calculated to be exceeded during operation. During operation under the second mode the soluble phosphorus level in the effluent averaged approximately 0.03 milligrams per liter of clarified water with a total removal efficiency averaging between 80 and 97% during the year period of operation. During the rainy portion of operation under the second mode, it was difficult to maintain sufficient COD and phosphorus to demonstrate effectiveness and for part of the rainy period, additional amounts of each were added to allow continued study. During operation in the second mode, no acetate had to be added to effect substantial phosphorus removal.

It is to be understood that while certain forms of the present invention have been illustrated and described herein, it is not to be limited to the specific forms or arrangement of parts described and shown.

What is claimed and desired to be secured by Letters Patent is as follows:

1. A process for biologically treating wastewater comprising the steps of:
   a) flowing influent wastewater with organic components therein into a first anaerobic region;
   b) measuring the average phosphorus content by weight of said influent wastewater;
   c) measuring the average short chain fatty acid content by weight of said influent wastewater;
   d) mixing the influent wastewater in said first anaerobic region with a microorganism biomass to form a mixed liquor;
   e) flowing a portion of the mixed liquor into a second anaerobic region wherein said biomass ferments portions of said organic components so as to produce short chain fatty acids;
   f) ensuring that the flow of mixed liquor to said second anaerobic region is sufficient to produce enough short chain fatty acids in said second anaerobic region that when combined with the short chain fatty acids in said influent wastewater the total is greater than four times the amount of phosphorus in said influent wastewater by weight;
   g) returning liquid from said second anaerobic region with said short chain fatty acids therein to said first anaerobic region wherein phosphorus is released from microorganisms in said biomass in said mixed liquor and short chain fatty acids are taken up by the microorganisms in said biomass;
   h) thereafter flowing mixed liquor from said first anaerobic region to an aerobic region wherein said short chain fatty acids are metabolized by the microorganisms in said biomass and phosphorus is absorbed by said microorganisms;
   I) thereafter transferring said mixed liquor to a clarifier region wherein clarified liquid is separated from said biomass; and
   j) returning at least a portion of the separated biomass with phosphorus therein to said first anaerobic region.

2. In a process for treating wastewater by mixing the wastewater with biomass to form a first mixed liquor in a first anaerobic region and thereafter treating the mixed liquor in an aerobic region; the improvement comprising the step of:
   a) prior to said wastewater entering said first anaerobic region diverting a first portion of said wastewater directly to a second anaerobic region wherein a second mixed liquor is subjected to a lower flow rate than in said first anaerobic region and thereafter returning the mixed liquor from said second anaerobic region to said first anaerobic region; and
   b) flowing a remaining second portion of the wastewater directly to said first anaerobic region.

3. The process according to claim 2 including:
   a) selecting said slip stream as less than about 10% by weight of a total wastewater flow.

4. A process for biologically treating wastewater comprising the steps of:
   a) collecting wastewater for treatment in a waste water influent region;
   b) flowing influent wastewater from said waste water influent region with organic components therein directly into a first anaerobic region and mixing the wastewater therein with a microorganism biomass to form a mixed liquor;
   c) flowing a portion of the mixed liquor into a second anaerobic region wherein said biomass ferments portions of said organic components so as to produce short chain fatty acids;
   d) forming a solids blanket of biomass in said second anaerobic region;
   e) flowing said wastewater in said second anaerobic region upwardly through said solids blanket;
   f) returning liquid from said second anaerobic region with said short chain fatty acids therein to said first anaerobic region wherein phosphorus is released from microorganisms in said biomass in said mixed liquor and short chain fatty acids are taken up by the microorganisms in said biomass;
   g) thereafter flowing the mixed liquor from said first anaerobic region to an aerobic region wherein said short chain fatty acids are metabolized by said microorganisms in said biomass and phosphorus is absorbed by said microorganisms;
   h) thereafter transferring said mixed liquor to a clarifier region wherein clarified liquid is separated from said biomass; and
   i) returning at least a portion of the separated biomass with phosphorus therein to said first anaerobic region.

* * * * *